United States Patent [19]
Ogawa et al.

[11] Patent Number: 6,016,249
[45] Date of Patent: *Jan. 18, 2000

[54] HOUSING UNIT

[75] Inventors: Nobuhiro Ogawa, Kawasaki; Masanori Tsukuda, Yashiro-machi, both of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/538,212

[22] Filed: Oct. 3, 1995

[30] Foreign Application Priority Data

Mar. 16, 1995 [JP] Japan ................................. 7-057795

[51] Int. Cl.⁷ ..................................................... G06F 1/16
[52] U.S. Cl. .......................... 361/685; 361/724; 248/581; 248/636; 248/638
[58] Field of Search ..................................... 361/683, 684, 361/685, 686, 727, 729, 730; 364/708.1; 248/581, 636, 638; 360/97.01, 97.03, 137, 900

[56] References Cited

U.S. PATENT DOCUMENTS

| | | |
|---|---|---|
| 4,896,777 | 1/1990 | Lewis ....................................... 361/685 |
| 4,979,909 | 12/1990 | Andrews . |
| 5,299,089 | 3/1994 | Lwee ......................................... 361/684 |
| 5,333,098 | 7/1994 | DeLuca et al. ........................... 361/685 |
| 5,402,308 | 3/1995 | Koyanagi et al. ....................... 361/685 |
| 5,463,527 | 10/1995 | Hager et al. ............................. 361/685 |
| 5,483,419 | 1/1996 | Kaczeus, Sr. et al. .................. 361/685 |
| 5,548,480 | 8/1996 | Rudi et al. ............................... 361/685 |

FOREIGN PATENT DOCUMENTS 4-318999  10/1992  Japan .

Primary Examiner—Donald Sparks
Assistant Examiner—John D. Reed
Attorney, Agent, or Firm—Staas & Halsey LLP

[57] ABSTRACT

This invention relates to a housing unit in which a certain unit is provided in a packaging case. The object of the invention is to reduce the number of parts and fabrication steps to lower production cost and to cushioned impact applied to the unit. A disc unit provided in the packaging case is urged by restoring forces of a first, a second and a third pressing portion, which are formed integrally with the packaging case. Also, the disc unit is held down to be secured by a stopper portion which secure disc units of different height.

12 Claims, 12 Drawing Sheets

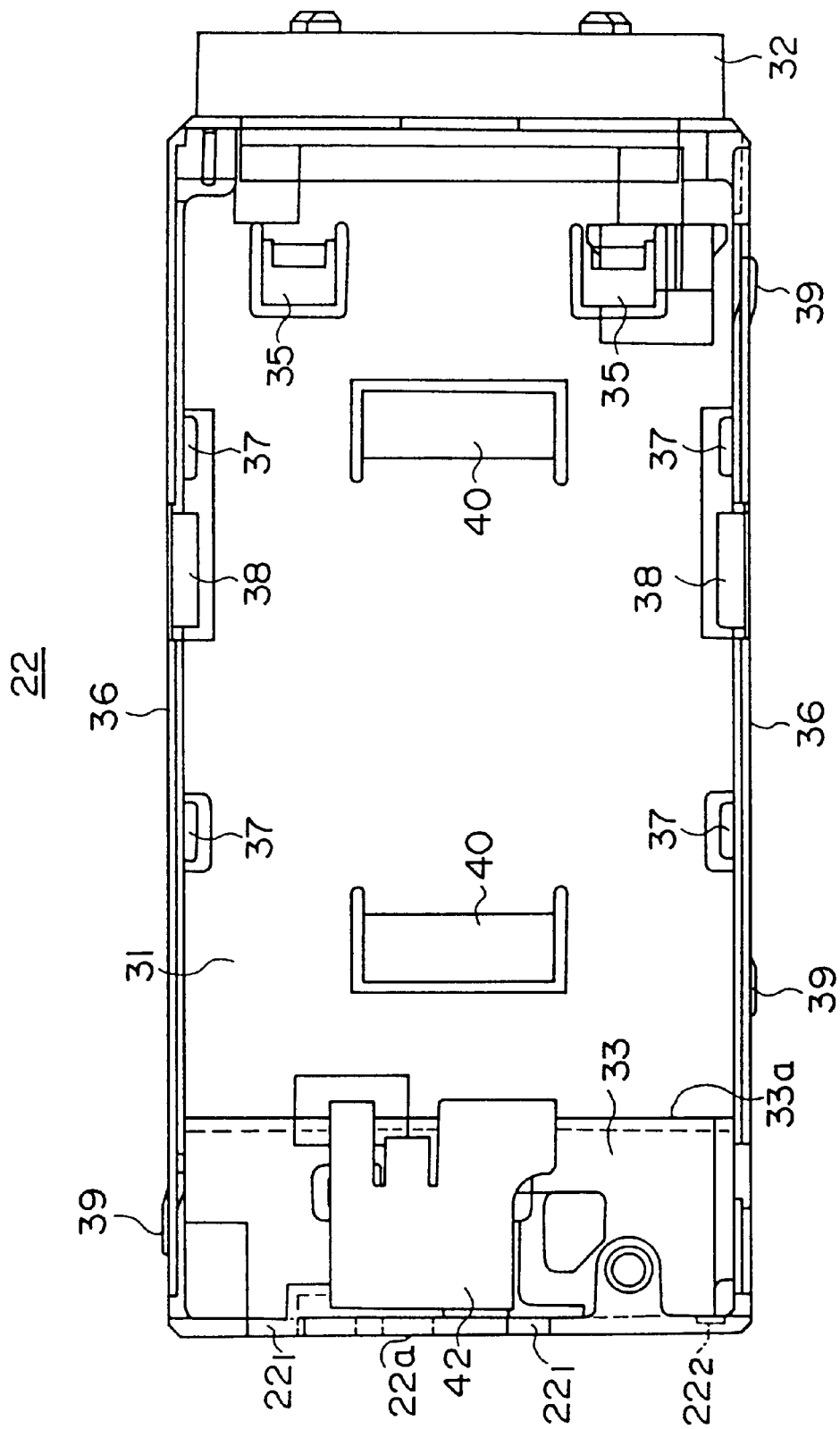

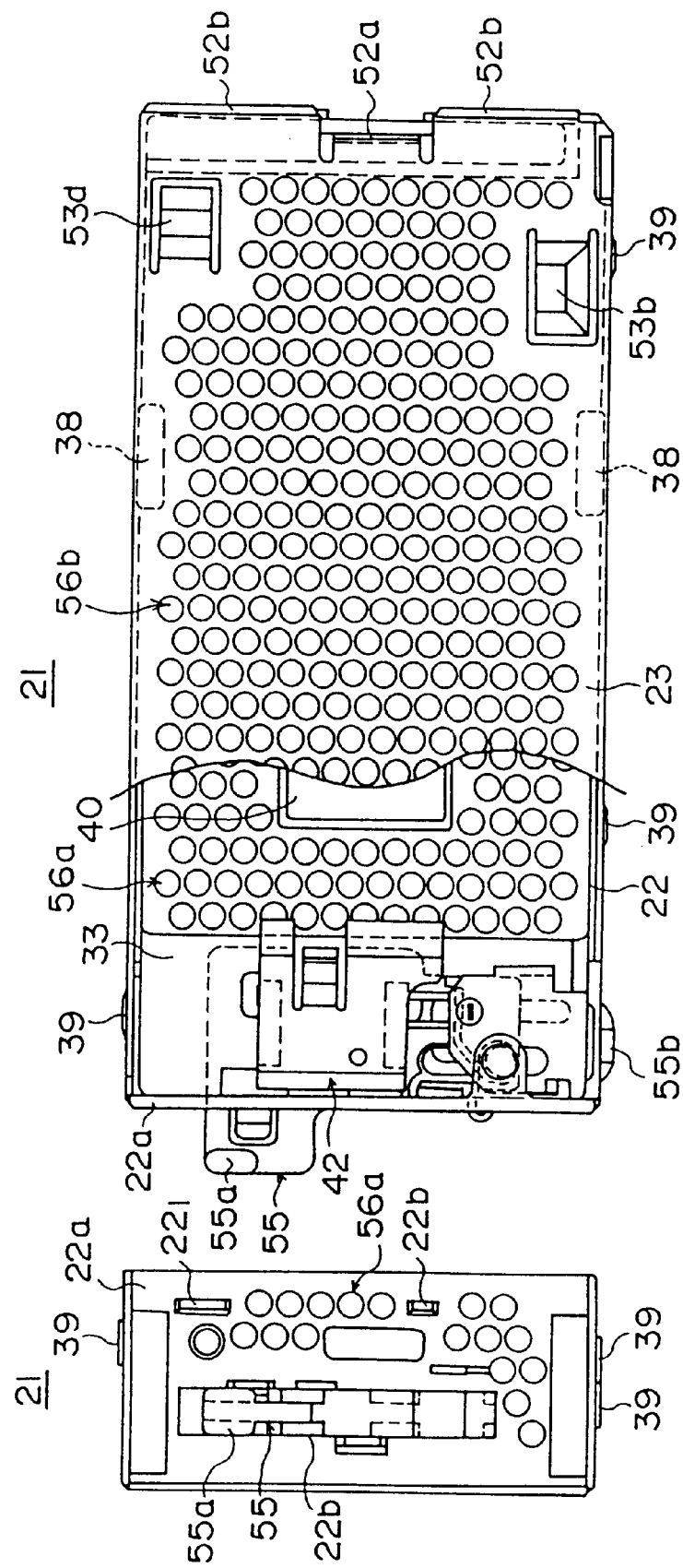

HOUSING UNIT

BACKGROUND OF THE INVENTION

1. Field of the Invention

The present invention generally relates to a housing unit, and more particularly to a housing unit in which a certain unit is accommodated in a packaging case.

2. Description of the Related Art

Currently, a disc unit having disc media as a recording media is accommodated and secured in a packaging case and the packaging case is mounted in a data device in order to prevent backlash of the disc unit. When the disc unit is accommodated and secured in the packaging case, the number of parts and production steps is required to be reduced.

FIG. 1 is a perspective view showing a conventional packaging case which accommodates a disc unit. In FIG. 1, a packaging case 12 which accommodates a disc unit 11 comprises a case 13 and a lid 14, which are generally made of metal plates to be fixedly secured to each other. In side faces of the case 13 facing each other, a prescribed number of screw holes 15a are formed. In the disc unit 11, a prescribed number of screw holes 15b, which correspond to those in the case, are formed. The disc unit 11 accommodated in the case 13 is secured by screws 16a through the screw holes 15a, 15b. The lid 14 is formed with a bent shape to provide a top surface and a side surface in which a predetermined number of screw holes 17b are formed in the bent or side face. In a back face of the case 13, a predetermined number of screw holes 17a are formed corresponding to those in the bent or side face. The lid 14 is placed and secured on the case 13 accommodating the disc unit 11 by screws 16b through the screw holes 17a, 17b. That is, in FIG. 1, when the disc unit is accommodated in the case 13 and the case is covered with the lid 14, these parts are fixedly connected at six positions by the screws 16a, 16b. In the lid 14, a number of plate springs 18 (in FIG. 1, three plate springs) are provided by, for example, welding. The plate springs 18, when the packaging case 12 is mounted in a data device, cushion impact and prevent backlash.

In the above packaging case 12, the disc unit 11 and the lid 14 are secured to the case 13 by the screws 16a, 16b. Therefore, a number of parts and fabrication steps are involved. Also, since the case 13 and the lid 14 is made of metal material, the production cost is high.

SUMMARY OF THE INVENTION

Accordingly, it is a general object of the present invention to provide a novel and useful housing unit in which the number of parts and fabrication steps can be reduced to lower production cost and any impact to the disc unit can be cushioned.

The above object of the present invention is achieved by a housing unit comprising a case, a device retained in the case, a resilient pressing portion in contact with the device, and a stopper portion connected to the case and in contact with the device, wherein the pressing portion resiliently presses the device toward the stopper portion. In the above invention, the pressing portion can comprise a first pressing part for pressing the device in a lengthwise direction of the case, a second pressing part for pressing the unit from an interior side of the case, and a third pressing portion for pressing the device from an interior bottom portion of the case. According to the above invention, the unit can be secured in the case without using screws. Thus, the number of parts and production steps can be reduced and production cost can be decreased.

In the above invention, the device can comprise at least one of a first device of substantially identical height as the case and a second device having a height less than that of the first unit. Also, in the above invention, the device can be a disc unit for recording data on a disc medium and reproducing data therefrom. According to the above invention, various units having different heights, such as disc units, can be accommodated in a single case.

In the above invention, the stopper portion can include stopper parts, the stopper parts having a height corresponding to the device. In the above invention, the stopper portion can comprise a first stopper portion and a second stopper portion, the first stopper portion is integrally formed with the case, the second stopper portion including stopper parts, having a height corresponding to the device. In the above invention, the stopper portion can comprise a first stopper portion and a second stopper portion, the first stopper portion being integrally formed with the case, the second stopper portion including stopper parts which can be switched awaiting to a height of the device retained to the case. Also, in the above invention, the pressing portion includes a stage portion, the stage portion having a height corresponding to the device. According to the above invention, various units having different heights can be accommodated in a single case.

The above invention can further have a lid engageable with the case to cover the case. Also, the above invention can further have a lid engageable with the case, wherein, at least one of the case and the lid has an elastic cushioning portion for cushioning impact from an outer device mounted thereon. According to the above invention, an impact from an external device can be cushioned.

In the above invention, at least one of the case and the lid can be made of resin material. Also, in the above invention, the pressing portion, the stopper portion and a cushioning portion for cushioning impact from an outer device mounted thereon can be integrally formed with the case and the lid of the case by resin material. According to the above invention, the production cost can be reduced compared to that of a metal case.

The above object of the present invention is also achieved by a housing unit comprising, a case, a device retained in the case, a cushioning material for cushioning impact applied to the device retained in the case, and a stopper portion connected to the case and in contact with the device, wherein the cushioning material resiliently presses the device toward the stopper portion. In the above invention, the device can be a disc unit for recording data on a disc medium and reproducing data therefrom. According to the above invention, impact applied to the device can be cushioned by the cushioning material.

The above object of the present invention is also achieved by a housing unit comprising a case, a plurality of devices retained in the case, and a cushioning material for cushioning an impact applied to the case, the cushioning material being provided between the devices. In the above invention, the device can be a disc unit for recording data on a disc medium and reproducing date therefrom. According to the above invention, impact applied to the devices can be cushioned by the cushioning material.

Other objects and further features of the present invention will be apparent from the following detailed description when read in conjunction with the accompanying drawings.

BRIEF DESCRIPTION OF THE DRAWINGS

FIG. 3 is a plan view showing a case shown in FIG. 2;

FIG. 7A is a front view showing a front panel of a packaging case;

FIG. 7B is a plan view showing the packaging case;

DESCRIPTION OF THE PREFERRED EMBODIMENTS

The preferred embodiments of the present invention will now be described in further detail with reference to the accompanying drawings.

Figure 1:
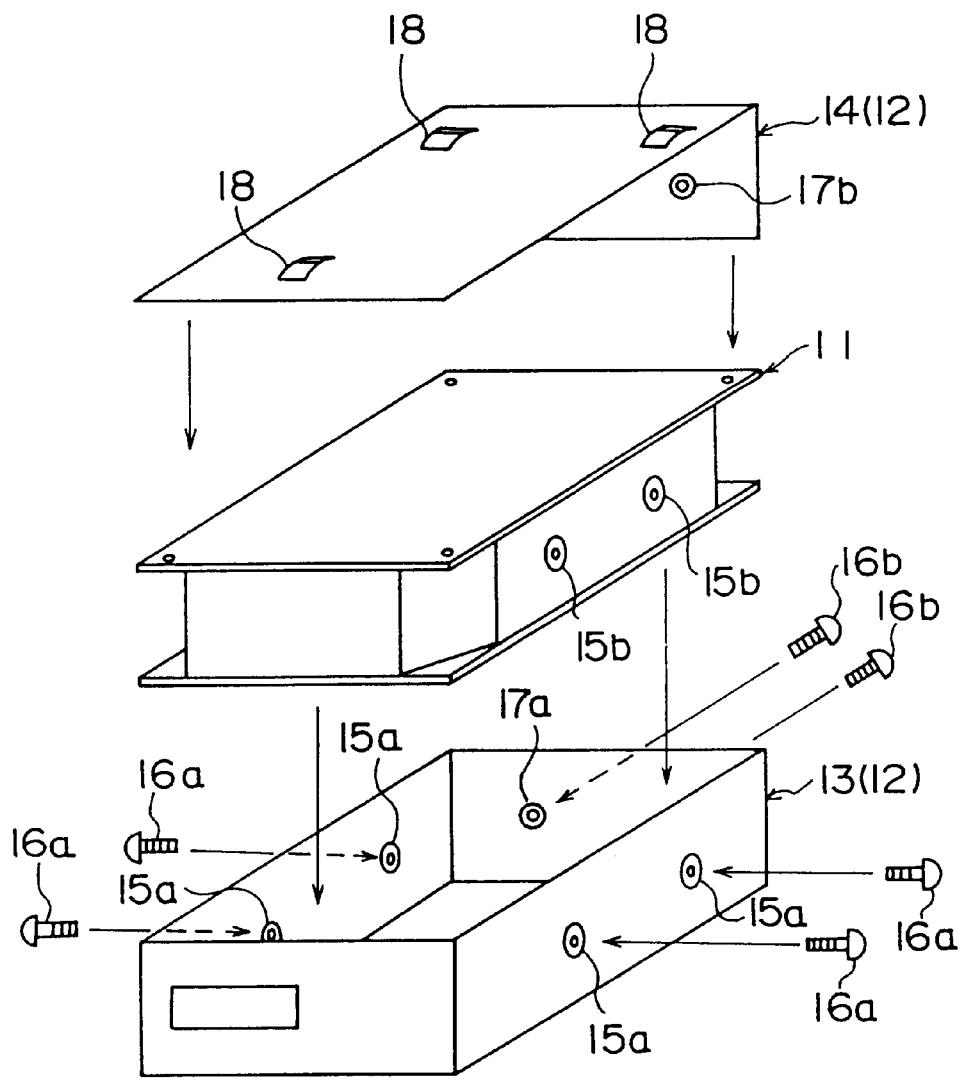
FIG. 1 is a perspective fabrication view showing a conventional packaging case of a disc unit.
Figure 2:
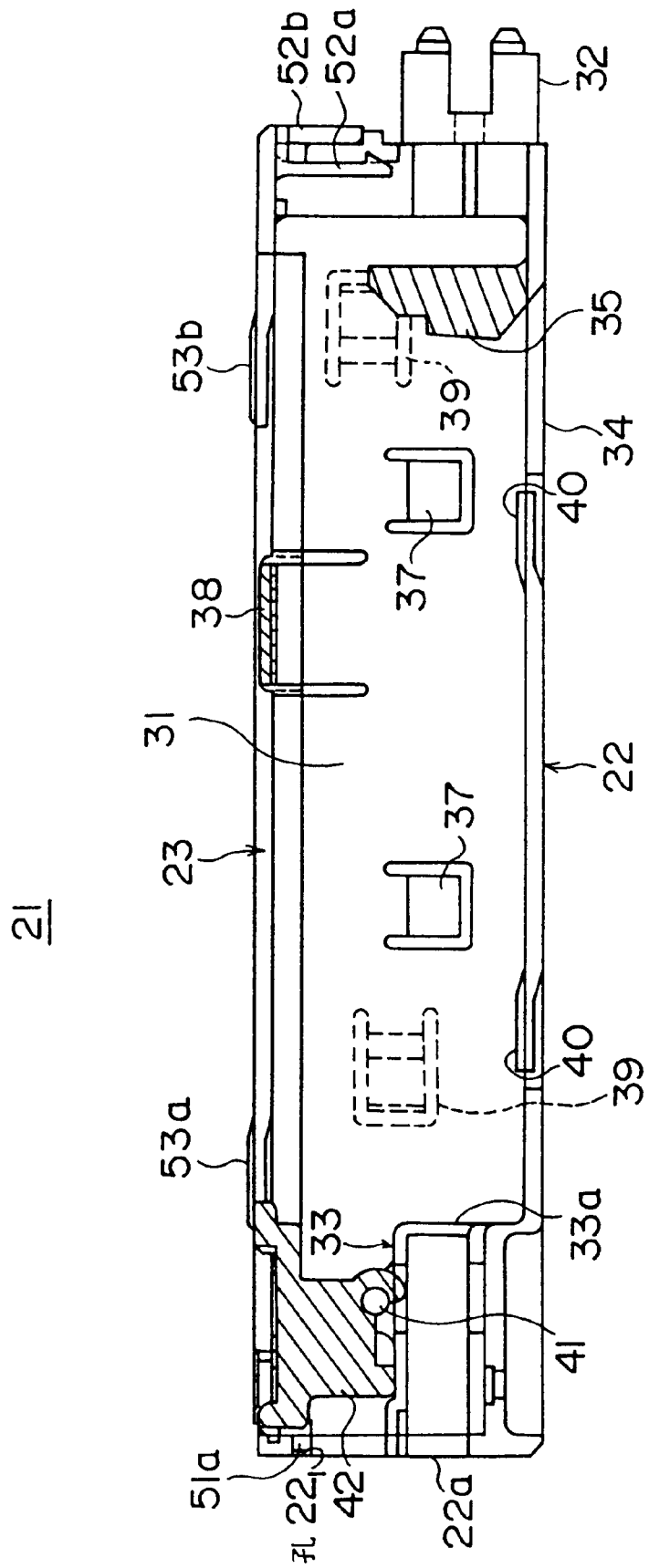
FIG. 2 is a sectional view showing a first embodiment of the present invention.

FIG. 2 is a sectional view showing a packaging case for a housing unit of a first embodiment of the present invention. FIG. 3 is a plan view showing the case shown in FIG. 2.

The packaging case 21 comprises a case 22 and a lid 23. As shown in FIGS. 2 and 3, the case 22 has a box-shape, which has a housing space 31 in which a disc unit (described later) is accommodated. In the drawings, the left side of the FIGS. shows a front end and the right side shows a rear end of the case 22. At the back end, a terminal portion 32 is provided to be electrically connected to a data device (not shown). The data device is an external device to which the packaging case 21 is mounted. At the front end of the housing space 31, a stage portion 33 is provided. The stage portion has a vertical face 33a for contacting the disc unit provided in the case 21. At the back or rear end of the housing space 31, first pressing portions 35 are provided. Two such pressing portions are shown, one on either side of the housing. The pressing portions 35 are formed of an elastic material and extend vertically from the bottom portion 34 of the case.

The case 21 has two sides 36 extending between the front and rear ends. The sides 36 being integral with the ends thereof. Second elastic pressing portions 37 are provided on interior side walls of each of the sides 36. Two such pressing portions 37 are provided on the interior of each side wall. A first hold down portion 38 is also provided on each side edge 36 along a top edge portion. The hold down portion 38 functions as a stopper to hold the disc unit. Also, an outer elastic pressing portion 39 is provided along each side 36. On the bottom 34, third elastic pressing portions 40 are provided at two locations along the interior.

The case body 22 is made of a resin material such as ABS (acrylonitrile butadiene styrene) resin. Each of the foregoing described pressing and hold down portions are molded integrally with the case body 22.

The stage 33 in the case 22 is rotatable about a rotational axis by rotational hooks 43 (only one of which is shown) provided integrally therewith. A second hold down portion 42 is defined by the stage 33 and functions as a stopper for the disc unit. Also at the front end of the case is a front panel 22a. Two holes $22_1$ and a groove $22_2$ are formed therein. The holes and the groove are engageable with the lid 23.

Figure 4A:
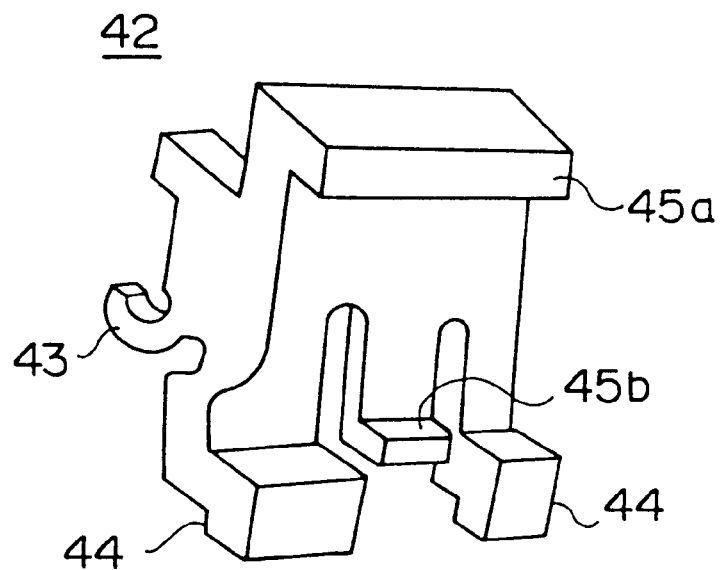
FIG. 4A is a perspective view showing a second pressing portion.
Figure 4B:
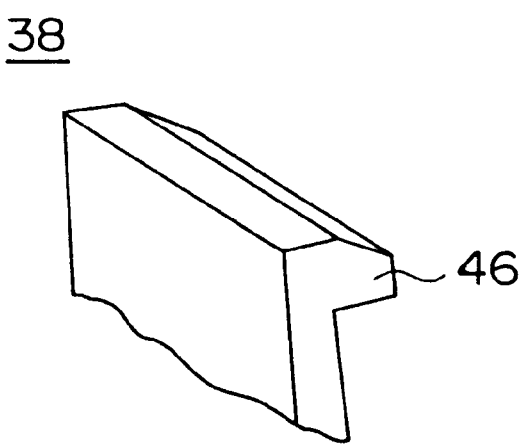
FIG. 4B is a perspective view showing a first hold-down portion.

FIGS. 4A and 4B are perspective views showing each stopper portion discussed above. FIG. 4A shows the second hold down portion 42. Therein, one of the rotational hooks 43 is shown. An identical hook is on the opposite side of the portion 42 so that, upon engagement with an appropriate member, the portion 42 is rotatable and can provide two different surfaces for contacting two different size disc units. The portion 42 has two leg sections 44 for contacting and holding an upper surface of a first disc unit having a full height of 41.3 mm. An upper and lower face of a second disc unit of 25.4 mm (1 in.) height is positionable between second and third hold down parts 45a, 45b. Each of the hold down parts 44, 45a and 45b is integrally formed with the second hold down portion 42. Thus, by rotating the portion 42 about the hooks 43, the first hold down part 44 or the second and third hold down parts 45a, 45b are switched to correspond to the height of the first or second disc unit so that the disc unit is held down by the pressing portion 42.

FIG. 4b is a partial perspective view of the first hold down portion 38 which had a fourth hold down part 46 integrally formed therewith and extending in a substantially claw-like shape.

Figure 5A:
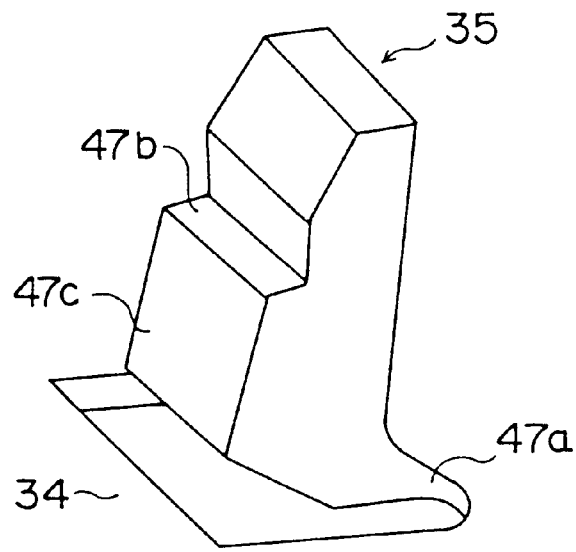
FIG. 5A is a perspective view showing a first pressing portion.
Figure 5B:
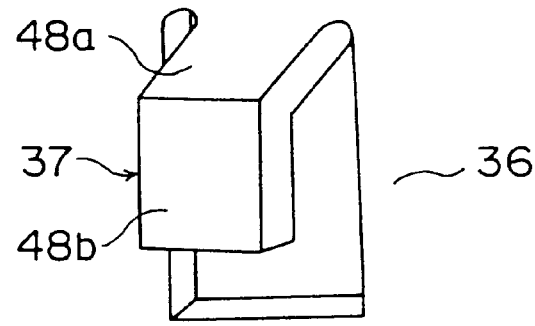
FIG. 5B is a perspective view showing a second pressing portion.
Figure 5C:
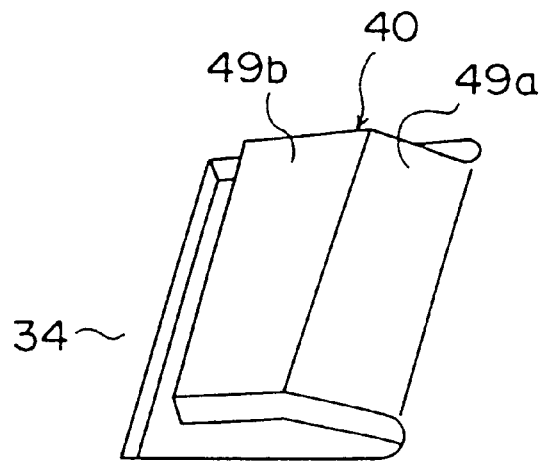
FIG. 5C is a perspective view showing a third pressing portion.

FIGS. 5A, 5B and 5C are partial perspective views showing each of the pressing portions shown in FIG. 3.

FIG. 5A shows the first pressing portion in which a base portion 47a extends from a bottom portion 34. The first pressing portion is made from an elastic material so as to resiliently bias a disc unit. A disc unit is urged to the contacting face 33a of the stage portion 33 by the elastic resiliency of the first pressing portion. A section 47b is provided in the middle of the first pressing portion. Thus, a first disc unit of full height is urged by a lower part 47c of the first pressing portion 35 and a second disc unit of less height is urged by the section 47b on which a lower corner of the second disc unit is placed.

FIG. 5B is a partial perspective view of the second pressing portion 37 which extends inwardly from the side portion 36 and is formed as an elastic member. The side face of the disc unit is urged to the side portion facing thereof by the projecting face 48b due to the restoring force of the base portion 48a.

FIG. 5C shows the third pressing portion 40 which extends from the bottom portion 34. The bottom face of the disc unit is urged upwardly by a projecting face 49b due to a restoring force of a base portion 49a. The above first, second and third pressing portions 35, 37 and 40 do not only press the accommodated disc unit to secure the unit, but also to cushion the unit and isolate it from external impact or force.

Figures 6A, 6B:
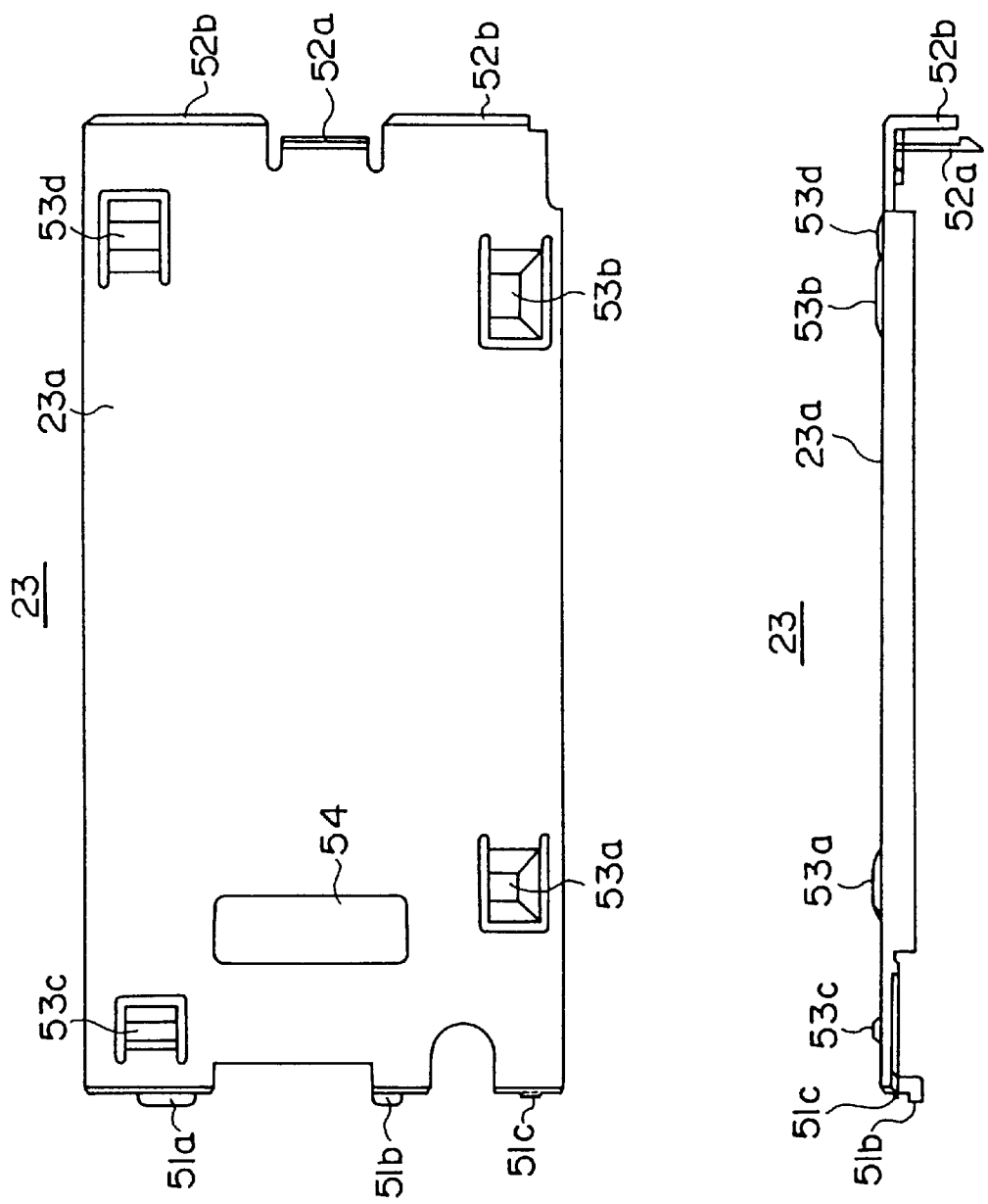
FIG. 6A is a plan view showing a lid.
FIG. 6B is a side view showing the lid.

FIGS. 6A and 6B are schematic illustrations showing the lid as shown in FIG. 2, in which FIG. 6A is a plan view and FIG. 6B is a side view. A shown in FIGS. 6A and 6B, projecting portions 51a, 51b and 51c, formed in a bent angle shape of approximately 90° are provided in the front side of the lid 23. The projecting portions 51a, 51b are inserted into two holes $22_1$ formed in the front panel 22a (FIG. 7A) of the case 22 and the projecting portion 51c is engaged with the groove $22_2$ formed in the front panel 22a. At the back end portion of the lid 23, a first overhang portion 52a is formed along the center. At positions extending backwards of the lid 23, second overhang portions 52b are formed parallel to the portion 52a. A back wall of the case 22 is insertable between the first overhang portion 52a and the second overhang portions 52b. Thus, the interconnections between the front side of the lid 23 and the first and second overhang portions 52a, 52b are engaged with the case 22 so that the lid 23 covers the case 22. On an upper surface 23a of the lid 23, four cushioning portions 53a, 53b, 53c and 53d extend from the upper surface 23a and cushion impacts when the packaging case 21 is mounted in the data device. The lid 23 has an opening portion 54. The lid 23 is integrally molded by resin material such as ABS resin.

FIGS. 7A and 7B are schematic and broken views showing the packaging case, in which FIG. 7A is a schematic illustration showing a front panel of the packaging case and FIG. 7B is a broken and plan view showing the packaging case. In the packaging case 21, shown therein, the lid 23 is mounted on the case 22. On the stage portion 33 of the case 22, a mounting mechanism for mounting the packaging case 21 in the data device is provided. A lever 55a protruding from one side portion of the case 22 is rotated so that the packaging case is put into or taken out of the data device. In the case 22 and the lid 23, a prescribed number of round holes 56a, 56b, which are omitted in FIGS. 3, 6A and 6B are formed. These holes 56a,b are for radiating heat. When the packaging case 21 is mounted in the data device, the outer pressing portions provided in the case 22 and the cushioning portions 53a, 53b, 53c and 53d are formed in the lid 23 contact an inner wall of the mounting area in the data device. External impacts from the data device are cushioned by the restoring force of the outer pressing portions 39 and cushioning portions 53a, 53b to avoid deleterious effects to the disc unit.

Figure 8:
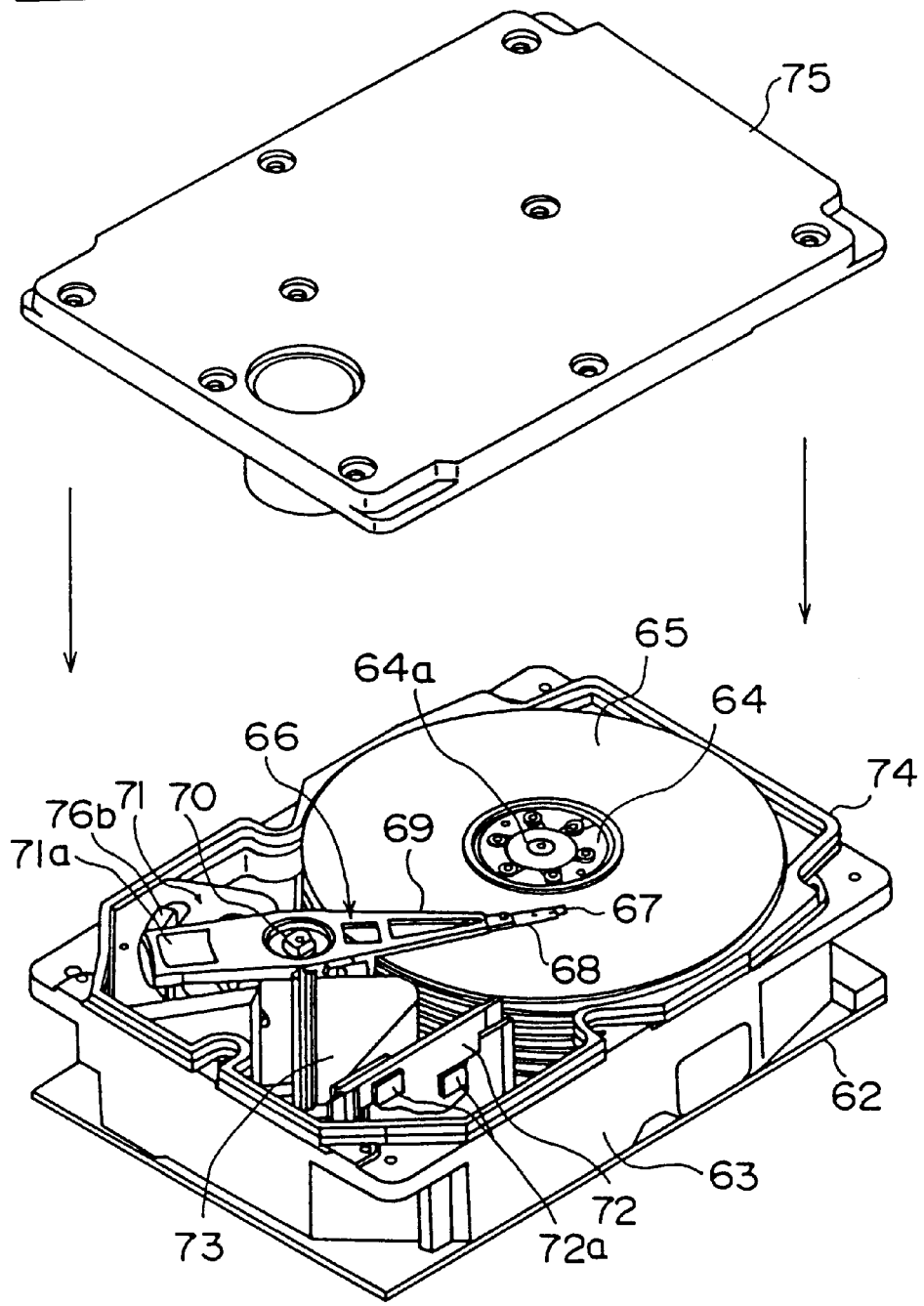
FIG. 8 is a perspective view showing a disc unit accommodated in the packaging case.

FIG. 8 is a perspective view showing the disc unit accommodated in the packaging case. In the disc unit 61 shown in FIG. 8, a prescribed number of discs 65 in which data is recorded or reproduced are provided. The discs are rotated on a spindle 64a of a spindle mechanism in an enclosure 63 having a base 62. An actuator 66 has a prescribed number of arms 69 (one is shown) fixed on a rotational axis 70. A supporting spring mechanism 68 supporting a recording/reproducing head 67 is provided at one end. At an opposite end of the arm 69, a voice coil motor (VCM) 71 is provided as a driving means and comprises a voice coil 71a and a magnet 71b. The VCM is connected to a printed circuit board 72, in which a IC 72a for the head is mounted, through a flexible printed circuit board (FPC). The enclosure 63 is covered with a cover 75 through a sealing member 74. The height of the disc unit 61 depends on the size and number of discs used. For example, the first disc unit 61a has a total height of approximately 41.3 mm and the second disc unit 61b of 1 inch height (25.4 mm) is accommodated in the packaging case 21.

Figures 9A, 9B:
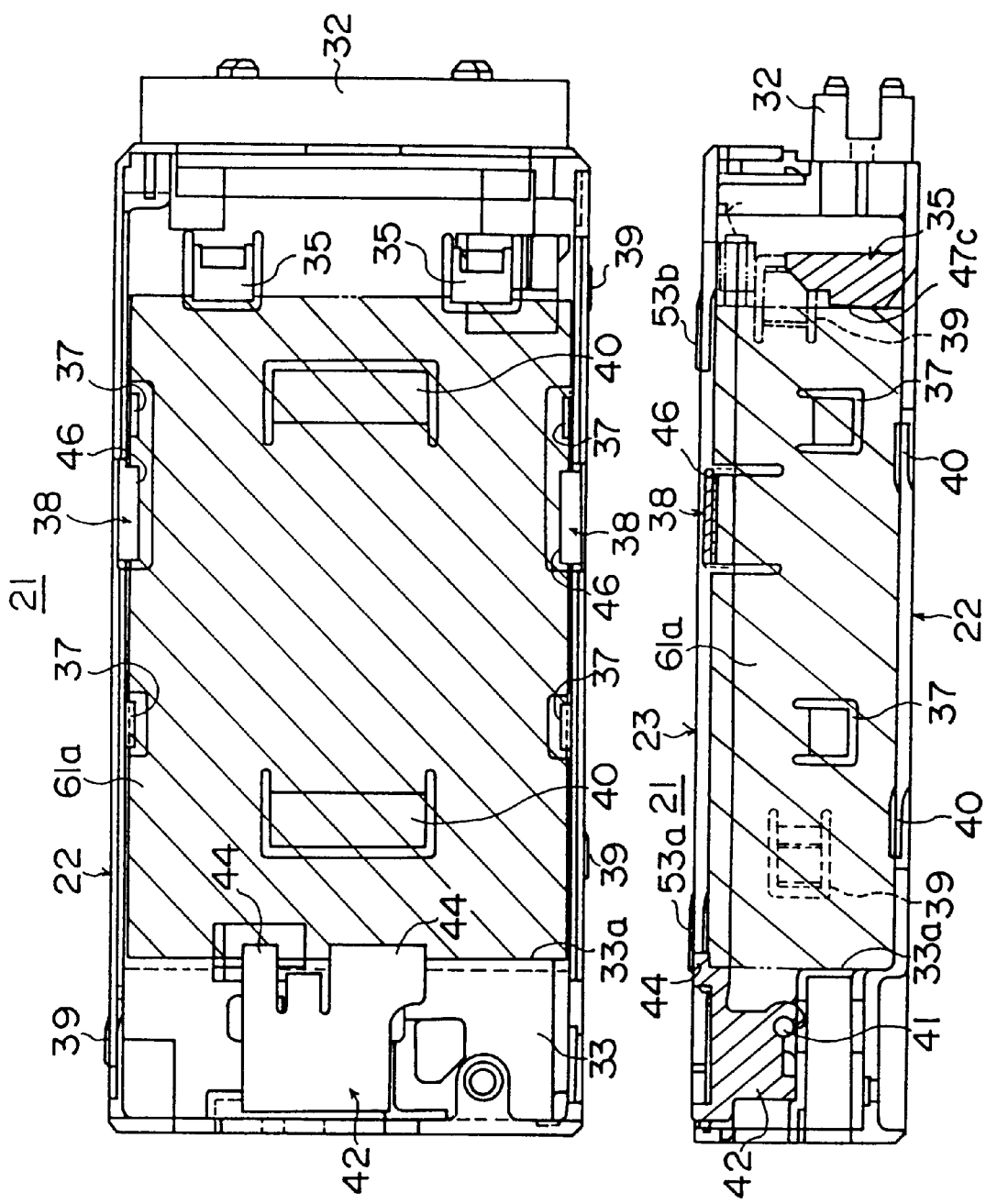
FIG. 9A is a plan view showing a first disc unit accommodated in the packaging case.
FIG. 9B is a sectional view showing the first disc unit accommodated in the packaging case.

FIGS. 9A and 9B are schematic illustrations showing the first disc unit accommodated in the packaging case, in which FIG. 9A is a plan view showing an internal structure thereof and FIG. 9B is a sectional view thereof. In FIGS. 9A and 9B, the first disc unit 61a is indicated by a hatched portion and the mounting mechanism shown in FIGS. 7A and 7B is omitted. In FIGS. 9A and 9B, the first hold down part 44 of the rotatable second hold down portion 42 is located at an upper position in the packaging case 21. The first disc unit 61a accommodated in the housing space 31 is held down by the first hold down parts 44 and the fourth hold down part 46 of the first hold down portion 38. The lower part 47c urges the first disc unit 61a away from the back end by the restoring force of the two first pressing-portions 35 so that the front face of the first disc unit is pressed to the contacting face 33a. From both sides, of the side portions 38 facing each other, the first disc unit 61a is urged by the restoring force of the second pressing portion 37. Also, the first disc unit is urged from the bottom portion 34 in the direction of the lid 23 by the restoring force of the third pressing member 40. By those features described above, the first disc unit 61a is secured in the packaging case 21. Also, the first, second, and third pressing portions 36, 37, and 40 cushion the unit from impacts.

Figure 10:
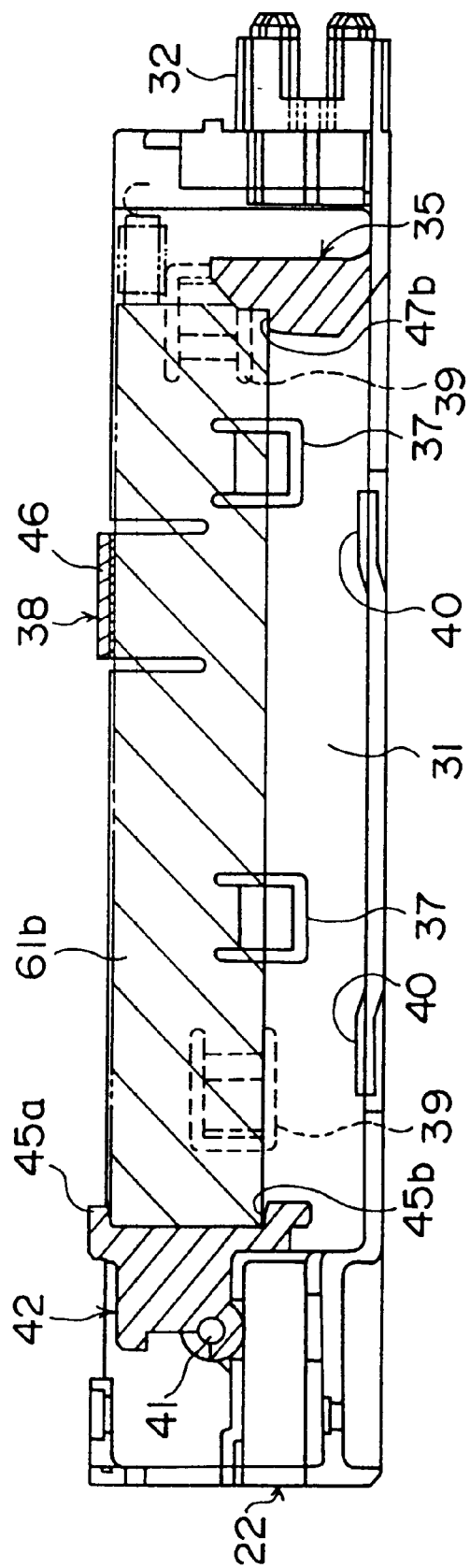
FIG. 10 is a sectional view showing a second disc unit accommodated in the packaging case.

FIG. 10 is a sectional view showing the second disc unit accommodated in the packaging case. In FIG. 10, the lid 23 is omitted. In FIG. 10, the second hold down portion 42 is rotated to the right, in the drawing, by approximately 90° on the rotational axis 41. In the housing space 31, the second hold down part 45a and the third hold down part 45b are positioned. When the second disc unit 61b of 1 inch height is accommodated, the front side of the second disc unit 61b is put between the second hold down part 45a and the third hold down part 45b in the front side of the case 22. Also, in the back side of the case 22, the back end portion of the second disc unit 61b is placed on the stage portion 47b of the two first pressing portions 35. In this case, the second disc unit 61b is urged to the second hold down portion 42 of the front side by the restoring force of the first pressing portion 35.

The upper face of the second disc unit 61b is held down by the fourth hold down parts 46 of the first hold down portion 38. Also, the second disc unit 61b is supported by two second pressing potions 37 facing each other between the side portions. Therefore, the second disc unit 61b is secured inside the case 22. That is, inside the case 22 (packaging case 21), the second disc unit 61b is secured, and the first and second elastic pressing portion 35, 37 perform functions as cushioning material.

As described above, the first and second disc units 61a, 61b, which are different in height, can be accommodated in a single packaging case 21. Also, when the first and second disc units 61a, 61b are accommodated in the packaging case, no screws are required. Therefore, the manufacturing cost can be reduced because the number of parts and operational steps can be reduced. Also, since the packaging case 21 can be made of resin material, low-cost manufacturing can be realized. Further, impacts applied to the first and second disc unit 61a, 61b can be cushioned by the first, second and third pressing portions 35, 37 and 40 provided in the case 22 and the lid 23. Moreover, impacts applied to the first and second disc units from outside of the unit can be cushioned by the outer pressing portion 39 and cushioning portions 53a–53d.

Figure 11:
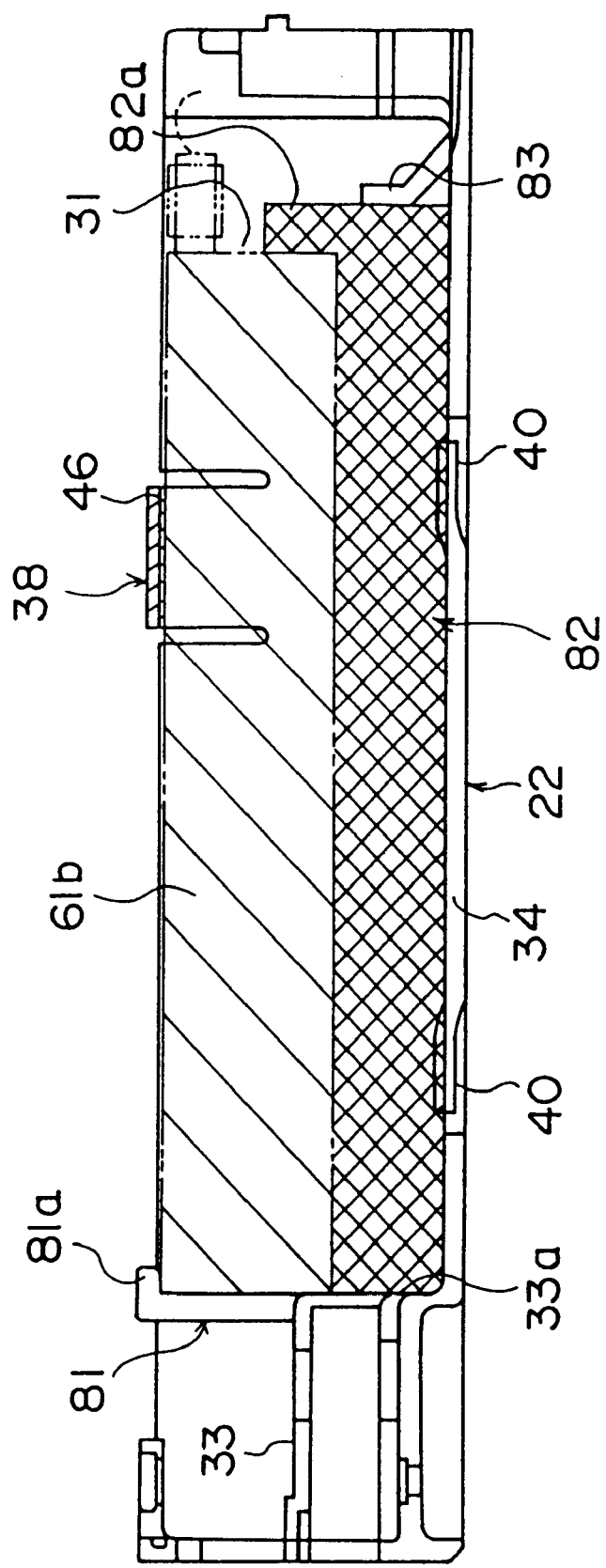
FIG. 11 is a sectional view showing a second embodiment of the present invention.

FIG. 11 is a sectional view showing a second embodiment of the present invention. FIG. 11 shows the case 22 of the packaging case 21. Since the lid is the same as that described in the first embodiment, the description thereof is omitted. The case 22 shown in FIG. 11 accommodates the second disc unit 61b having a smaller height than the case 22, for example, a 1-inch high disc unit. In the case 22 shown in FIG. 11, instead of the second hold down parts of the first embodiment, another hold down part 81 is provided vertically on the stage 33 and a tip end thereof is integrally formed in a further hold down part 81a.

On the bottom portion 34 in the housing space 31, a cushioning material 82 is provided. The cushioning portion 82 is made of cushioning gum or styrene foam. The height of the cushioning portion 82 (except the wall portion 82a) is designed to be a little higher than that of the housing space 31 when the height of the second disc unit 61a is added to that of the cushioning portion 82. The cushioning material 82 is pressed by an additional pressing portion 83 toward the contacting face 33a of the front side. That is, the additional elastic pressing portion 83 extends vertically from the bottom portion 34 and presses the cushioning material by its restoring force. The second disc unit 61b mounted on the cushioning material 82 is held down by the hold down portion 81 and is held down from the upper face thereof to be secured. Like the first embodiment, the second pressing portion 37 or the outer pressing portion 39 can be provided at both sides 36, if desired.

In the second embodiment, impact from outside the unit can be cushioned by the cushioning material 82 and deleterious effects of such impacts to the second disc unit 61b can be avoided. Other features and benefits are the same as those of the first embodiment. The cushioning material 82 does not have to be spread across the entire bottom portion 34 but can be divided into several parts and placed at desired positions.

Figure 12:
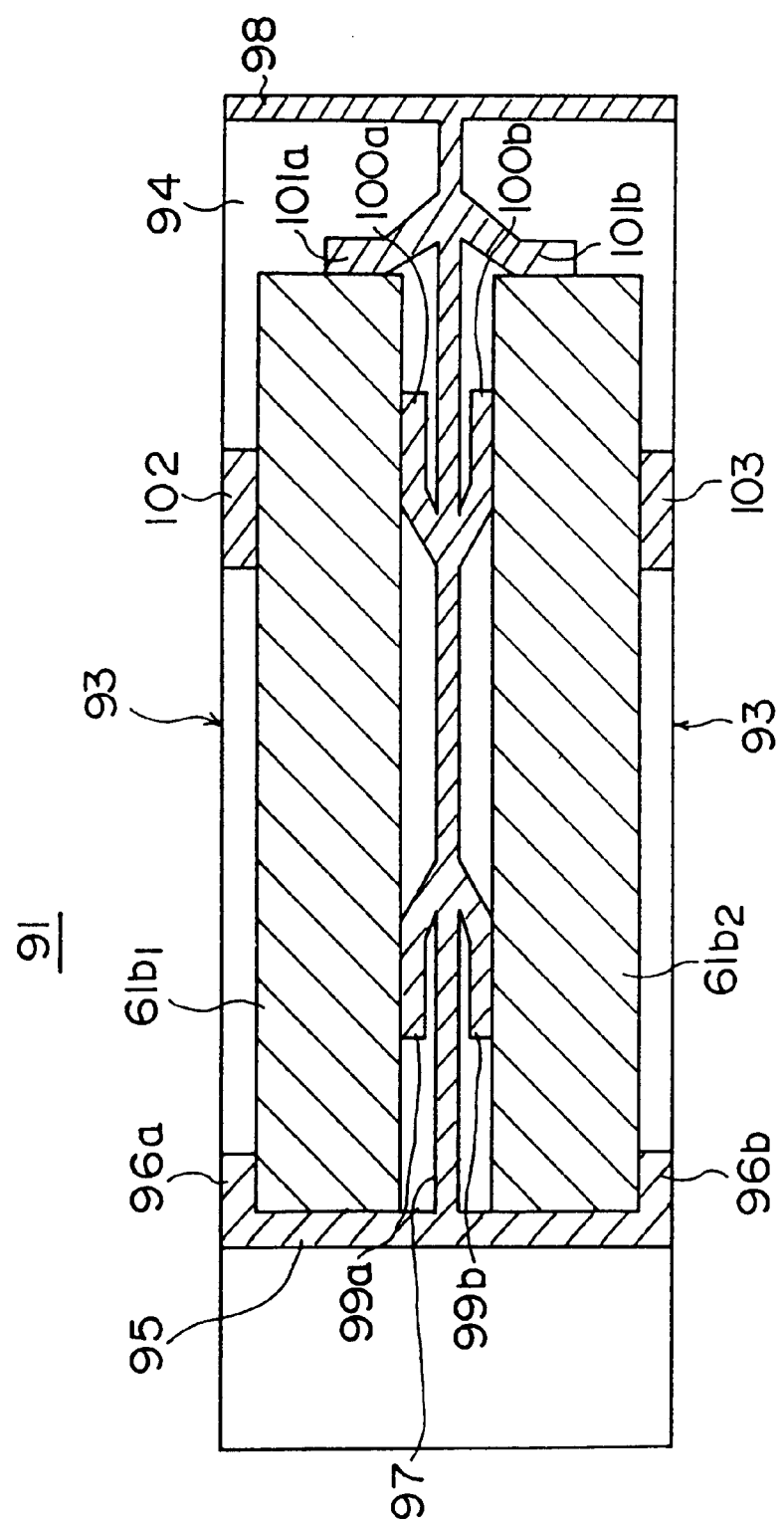
FIG. 12 is a sectional view showing a third embodiment of the present invention.

FIG. 12 is a sectional view showing a third embodiment of the present invention. A packaging case 91 shown therein comprises a case made of resin material and a lid 93. In a housing space 94 of the case, two disc units having a height less than that of the space portion 94, for example, two disc units of 1-inch 61b (61$b_1$, 61$b_2$) are accommodated.

In FIG. 12, the left side is the front side of the case. At the front side of the housing space 94, a contacting portion 95 is provided. At the upper and lower end thereof, sixth and seventh hold down parts 96a, 96b are formed integrally. At the back end portion thereof, a supporting member 98 is provided through a connecting portion 97 dividing the housing space 94 in two along the central portion in a vertical direction of the contacting portion 95.

At prescribed positions of the connecting portion 97 (i.e. two positions), fifth elastic pressing portions 99a, 99b and sixth elastic pressing portions 100a, 100b are provided in the vertical direction. From the back side, a seventh elastic pressing portion 101a, 101b are provided to press in the forward direction.

The contacting portion 95, the connecting portion 97, the supporting portion 98 and the fifth through seventh pressing portion 99a, 99b, 100a, 100b, 101a and 101b are integrally molded by resin material such as ABS resin. On the bottom surface of the lid 93, a hold down portion 102 made of, for example, resin material, is positioned toward the back side of the housing space 94. In the bottom portion of the case 93, a hold down portion 103 is formed of a material such as resin.

In the packaging case 91, in which the two disc units 61$b_1$, 61$b_2$ are accommodated, an upper face of the upper second disc unit 61$b_1$ is held down by the hold down part 96a and the fourth hold down portion 102. Also, the upper disc unit 61$b_1$ is pressed in the upward direction by the restoring force of the fifth and sixth pressing portions 99a, 100a and is urged toward the contacting portion 95 by the restoring force of the seventh pressing portion 101a.

The lower face of the disc unit 61$b_2$ is supported by the seventh hold down part 96b and the fifth hold down portion 103. Also, the disc unit 61$b_2$ is pressed downwardly by the restoring force of the fifth and sixth pressing portions 99b, 100b. Further, the disc unit 61$b_2$ is urged toward the contacting portion 95 by the restoring force of the seventh pressing portion 101b.

According to the present invention, two disc units 61$b_1$, 61$b_2$ can be accommodated in a single packaging case without screws. Therefore, the manufacturing cost can be reduced by reducing the number of parts and production steps. Also, since the packaging case can be made of resin material, the production cost can be further reduced. Further, external impact can be cushioned by the restoring force of the fifth through seventh pressing portions 99a, 99b, 100a, 100b, 101a and 101b and effects on the two disc units can be avoided.

In the above first, second and third embodiments of the present invention, the disc unit 61 (61a, 61b, 61$b_1$,61$b_2$) is accommodated in the packaging case 21, 91. However, it goes without saying that other types of units can be accommodated therein.

Further, the present invention is not limited to these embodiments, but various variations and modifications may be made without departing from the scope of the present invention.

What is claimed is:

1. A housing unit comprising:

a case housing a selected one of a first unit and a second unit the second unit having a height different from that of said first unit;

a resilient pressing portion extending from said case and including two portions that are stationary, each of the two portions engaging a respective, selected one of said first and second units;

a stopper portion rotatably connected to said case and including two holding portions, each of the two holding portions engaging a respective, selected one of said first and second units and said two portions of said resilient pressing portion resiliently pressing said respective, selected one of said first and said second units toward said stopper portion so that the respective, selected one of said first and second units is retained in said case.

2. The housing unit of claim 1, wherein:

said case has a lengthwise direction and further comprises an interior side and an interior bottom portion;

said two portions of said resilient pressing portion include a first pressing part pressing said first and second units in said lengthwise direction, a second pressing part pressing said first and second units and disposed on said interior side of said case; and said resilient member further includes a third pressing part pressing said first and second units and disposed on said interior bottom portion of said case.

3. The housing unit of claim 1, wherein said first unit is of a substantially identical height as said case and said second unit is of a height less than that of said first unit.

4. The housing unit according to claim 1, wherein said first and second units are disc units for recording data on disc mediums and reproducing data therefrom.

5. The housing unit according to claim 1, wherein:

said housing unit further comprises an interior bottom portion; and said stopper portion comprises stopper parts, each of said stopper parts being positioned at a distance from said interior bottom portion of said housing unit, which distance corresponds to the height of one of said first and second units.

6. The housing unit according to claim 1, wherein:

said stopper portion comprises a first stopper portion and a second stopper portion, said first stopper portion is integrally formed with said case, said second stopper portion comprises stopper parts, and each stopper part is positioned at a distance from said first stopper portions, which distance corresponds to the height of one of said first and second units.

7. The housing unit according to claim 1, wherein:

said stopper portion comprises a first stopper portion and a second stopper portion, said first stopper portion being integrally formed with said case, said second stopper portion comprising stopper parts which are adjustable in accordance with the height of said first and second units disposed in said case.

8. The housing unit according to claim 1, wherein:

said housing unit further comprises an interior bottom portion;

said pressing portion comprises a stage portion; and said stage portion is positioned in said case at a distance from said interior bottom portion which corresponds to the height of one of said first and second units.

9. The housing unit of claim 1, further comprising a lid to engage said case to cover said case.

10. The housing unit of claim 1, further comprising:

a lid to engage said case;

said housing unit having an outer device mounted thereto; and at least one of said case and said lid comprises an elastic cushioning portion, cushioning impact from said outer device.

11. The housing unit of claim 1, further comprising:

a lid to engage said case; and at least one of said case and said lid is made of resin material.

12. A housing for at least first and second disc units, comprising:

a case including inner side walls;

a stationary resilient pressing portion on at least one of said inner side walls, said resilient pressing portion having two portions to contact a selected one of the first and second disc units, respectively; and a rotatable stopper portion on another of said inner side walls, opposite said pressing portion, to contact selectively the first and second disc units;

said pressing portion resiliently pressing a selected one of the disc units toward said stopper portion so that the selected disc unit is retained in said case; and said first and second disc units are of respective, different heights.

* * * * *